United States Patent [19]
Vinchant et al.

[11] Patent Number: 5,659,646
[45] Date of Patent: Aug. 19, 1997

[54] OPTICAL WAVEGUIDE TRANSITION AND METHOD OF FABRICATING IT

[75] Inventors: Jean-François Vinchant, Bruyeres le Chatel; Pierre Doussiere, Saint Germain les Arpajon, both of France

[73] Assignee: Alcatel N.V., Rijswijk, Netherlands

[21] Appl. No.: 378,278

[22] Filed: Jan. 26, 1995

[30] Foreign Application Priority Data

Jan. 27, 1994 [FR] France ................................. 94 00886

[51] Int. Cl.$^6$ ................................................ G02B 6/10
[52] U.S. Cl. .......................... 385/50; 385/131; 385/132; 385/43
[58] Field of Search .................................. 385/42, 43, 14, 385/50, 129, 130, 131, 132, 146

[56] References Cited

U.S. PATENT DOCUMENTS

| 3,785,717 | 1/1974 | Croset et al. | 385/132 |
| 5,142,596 | 8/1992 | Mizuuchi et al. | 385/132 |

FOREIGN PATENT DOCUMENTS

| 0498320A1 | 8/1992 | European Pat. Off. |
| 0583679A1 | 2/1994 | European Pat. Off. |

OTHER PUBLICATIONS

*Journal of Vacuum Science and Technology Part B*, vol. 10, No. 6, Nov. 1992, New York, pp. 2979–2983 – Bruckner et al.
*Electronics Letters*, vol. 28, No. 17, 13 Aug. 1992, Stevenage GB, pp. 1610–1611, Yoshimoto et al.
*Electronics Letters*, vol. 29, No. 4, 18 Feb. 2993, Stevenage GB, pp. 326–328, Swander.

*Primary Examiner*—John Ngo
*Attorney, Agent, or Firm*—Sughrue, Mion, Zinn, Macpeak & Seas

[57] ABSTRACT

The invention concerns an optical waveguide transition and its fabrication method, enabling coupling between a buried optical waveguide and a ridged optical waveguide. The transition structure is formed during etching of a layer containing the buried optical waveguide, the transition area being formed by adiabatically increasing the lateral dimensions of the buried waveguide. Top layers are deposited on the buried waveguide and its widened structure in the transition area, and the ridged optical waveguide is fabricated with one part on top of the transition area. Coupling of the respective propagation modes in the buried and ridged waveguides is effected by mode adaptation in the region between the two waveguide structures in the transition area. The transition of the invention is made in two conventional epitaxy steps.

11 Claims, 4 Drawing Sheets

OPTICAL WAVEGUIDE TRANSITION AND METHOD OF FABRICATING IT

BACKGROUND OF THE INVENTION

1. Field of the Invention

The field of the invention is that of optical components and more particularly that of optical components which can be integrated into hybrid or monolithic optical or opto-electronic integrated circuits. To be more precise, the invention concerns a transition between different waveguide structures providing optical interconnections between different components of an optical or electro-optical circuit. The waveguide structures to which the invention relates are known in this art as ridged optical waveguides and buried optical waveguides.

2. Description of the Prior Art

Electro-optical components that may need to be connected by interconnect waveguide structures include, for example: lasers, light-emitting diodes, photodiodes, electro-optical modulators, optical fibers, switches, couplers, optical amplifiers, reflectors, filters, diffraction gratings, etc. There will usually be a preferred waveguide structure for each component, for technological or performance reasons, and the preferred structure is not always the same for all the components that need to be interconnected. Whence the need for optical waveguide transitions between different types of waveguide structure.

To enable industrial integration of optical or opto-electronic circuits, whether of the hybrid or monolithic type, it must be possible to fabricate the transitions between the various waveguide structures using the same technologies as are used to fabricate the waveguide structures themselves.

Various prior art monolithic or hybrid integration techniques are described in the following documents, for example:

D1: "Micro hybrid integrated devices and components: Micro Photonic Devices" by K. Imanaka, SPIE v.1751, Miniature and micro-optics, 1992.

D2: "Monolithic vs. Hybrid approach for photonic circuits", by M. Erman, Proceedings ECIO, 1993.

D3: "L'optique intégrée dans les matériaux semiconducteurs III–V", by A. Carenco et al., L'Echo des Recherches, no. 137, 1989.

The prior art provides two techniques for integrating a buried optical waveguide and a ridged optical waveguide.

The first uses a butt-joint configuration, but this requires extremely close tolerances for the mechanical assembly which makes it difficult and costly but without which transmission losses at the transition are unacceptable.

The other technique is to use a mode converter at one end of the component, but this technique is extremely difficult if not impossible to integrate in a monolithic device.

The present invention attempts to remedy these drawbacks of the prior art and to facilitate the fabrication of an optical waveguide transition at reduced cost, with reduced transmission losses and in a manner compatible with integration.

SUMMARY OF THE INVENTION

To this end, the invention proposes an optical waveguide transition between a buried optical waveguide and a ridged optical waveguide, enabling wave coupling between a propagation mode of said buried optical waveguide and a propagation mode of said ridged optical waveguide, said transition comprising a transition area in which said buried optical waveguide widens laterally along its length and partial overlapping by vertical superposition of the two waveguides in said transition area enables coupling of said two propagation modes in a preferred direction of propagation in said two waveguides.

In accordance with a preferred feature of the invention the ridged optical waveguide has a constant width over all of its length and the buried optical waveguide has a width which varies adiabatically in said transition area.

In accordance with one specific feature of the invention said buried optical waveguide has a width which varies linearly in said transition area.

In accordance with another feature of the invention said buried optical waveguide has a width which varies exponentially in said transition area.

In an advantageous embodiment of the invention said buried and ridged optical waveguides are fabricated on the same substrate.

In accordance with another feature of the invention said transition includes a "waveguide layer" or core which is the same for both optical waveguides.

In one particular embodiment of the invention said transition area has an inclined termination to prevent unwanted reflections.

In accordance with a particularly advantageous configuration, an opto-electronic circuit comprises at least one optical waveguide transition in any of the preceding implementations. In one variant, said opto-electronic circuit is an integrated opto-electronic circuit. In another variant said integrated opto-electronic circuit is a monolithic integrated opto-electronic circuit.

The invention also proposes a method of fabricating an optical waveguide transition between a buried optical waveguide and a ridged optical waveguide, comprising the following steps:

a) growing at least one epitaxial layer on a substrate;

b) etching a waveguide layer to define a buried optical waveguide and a transition structure the width of which varies adiabatically;

c) growing at least one top epitaxial layer on top of said buried optical waveguide and said transition area;

d) etching a top layer to define a ridged optical waveguide structure superposed on said buried optical waveguide.

The invention will be better understood from the following detailed description and the appended drawings.

BRIEF DESCRIPTION OF THE DRAWINGS

FIG. 1 shows a step of fabricating the buried optical waveguide on the substrate of the opto-electronic circuit;

FIG. 2 shows the epitaxial deposition of layers on top of the buried optical waveguide;

FIG. 3 shows the etching of the ridged optical waveguides on the top surface of the device of the invention.

DETAILED DESCRIPTION OF THE PREFERRED EMBODIMENTS

The drawings show non-limiting embodiments of the invention. The same reference numbers refer to the same components in all the figures. For clarity, not all the figures are to the same scale.

Figure 1:
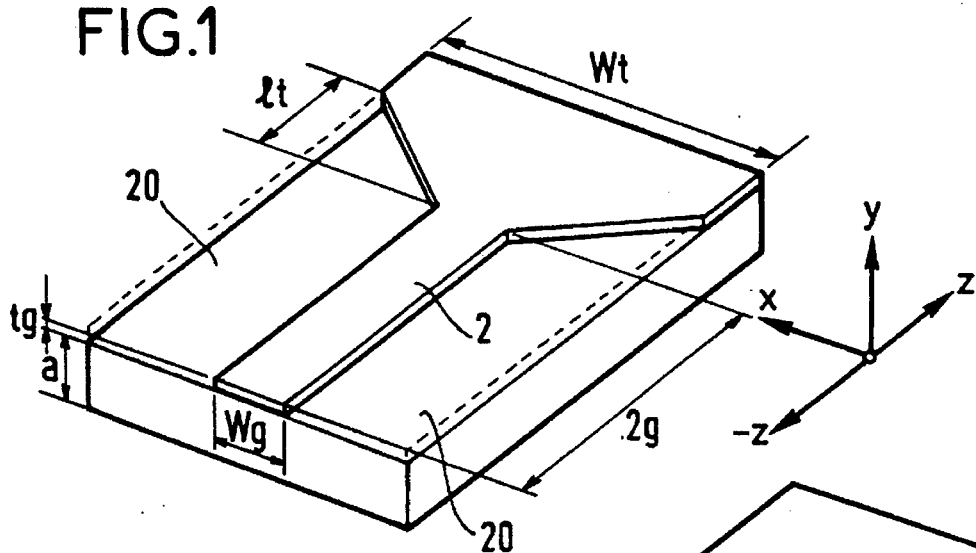
FIGS. 1, 2 and 3 are diagrammatic perspective views of various steps in the fabrication of an optical waveguide transition in accordance with the invention.

FIG. 1 shows a first step in the fabrication of a transition in accordance with the invention. On a substrate 1 of thickness $\underline{a}$ a waveguide layer 2 has been deposited using conventional epitaxial techniques for growing thin layers, as usually applied to the manufacture of electronic and opto-electronic components. The substrate 1 is a semiconductor substrate having the properties required for fabrication of the intended opto-electronic circuit. In the current state of the art, and as described in document D3 cited above, the substrate is a III–V substance, for example, such as $Al_xGa_{1-x}As$ on GaAs (x<1) or InP; researchers are currently working on the use of Si as a substrate for such circuits. The waveguide layer 2 is, for example, of GaAs (on an AlGaAs substrate) or $In_{1-x}Ga_xAs_yP_{1-y}$ or $In_{1-x-y}Ga_xAl_yAs$ on an InP substrate (x<1, y<1). III–V substances are regarded as promising for integrated opto-electronic circuits of this kind since their forbidden gap corresponds to wavelengths routinely used in active opto-electronic components (lasers, light-emitting diodes, etc) and passive opto-electronic components (optical waveguides, optical fibers, etc), and because purely electronic components can also be fabricated from these substances on the same substrate.

FIG. 1 shows only that part of the substrate which carries the transition, but the substrate covers a much larger area in the x-z plane and can incorporate many optical, electronic and electro-optical components. The epitaxial layer has a thickness $t_g$. Conventional etching techniques are used to remove areas 20 on each side to define a waveguide structure 2 having a width $w_g$ in a guided propagation area $2_g$ (which subsequently forms a buried optical waveguide) and a varying width in a transition area $2_t$ having a length $l_t$ in the propagation direction $\underline{z}$. In accordance with the invention, the width of the waveguide structure varies in the transition area $2_t$ between the width $w_g$ of the buried optical waveguide and the final width $w_r$ of the transition. In accordance with one advantageous feature of the invention the variation in this width is adiabatic.

Figure 2:
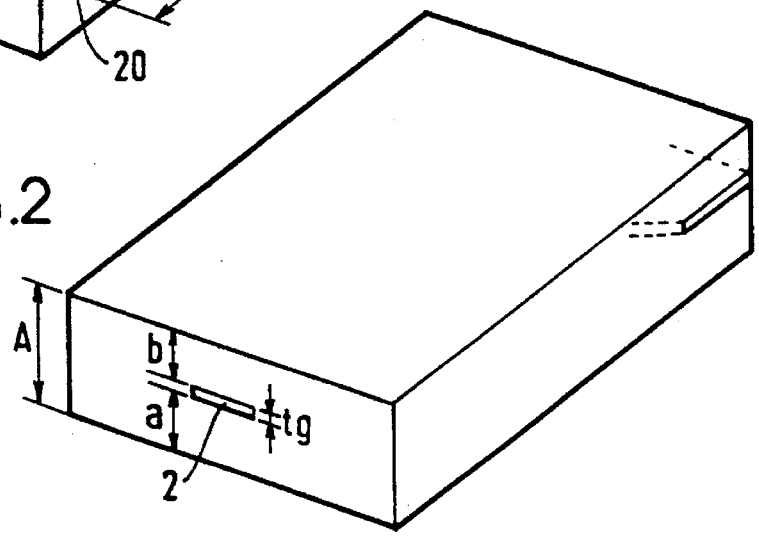

FIG. 2 shows an intermediate step in the fabrication of an optical waveguide transition in accordance with the invention. One or more epitaxial layers having a total thickness $\underline{b}$ have been deposited onto the waveguide structure 2 of FIG. 1 by conventional techniques familiar to the person skilled in the art. The total thickness A of the device is therefore made up of the thickness $\underline{a}$ of the substrate 1, the thickness $t_g$ of the buried optical waveguide and the thickness $\underline{b}$ of the top layer(s).

Figure 3:
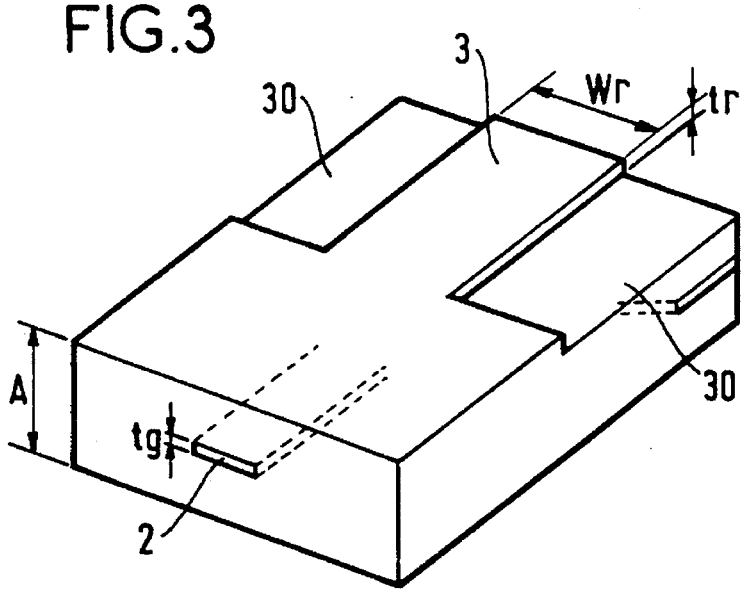

FIG. 3 shows the final step in the fabrication of a transition in accordance with the invention. Again using conventional techniques familiar to those skilled in the art, the top layer is etched to a depth $t_r$ to form a ridged optical waveguide 3 by removal of areas 30 on either side of said ridged waveguide 3. The beginning of the ridged optical waveguide 3 is therefore superposed on the transition area $2_t$ of the buried optical waveguide having a varying width.

Figure 4:
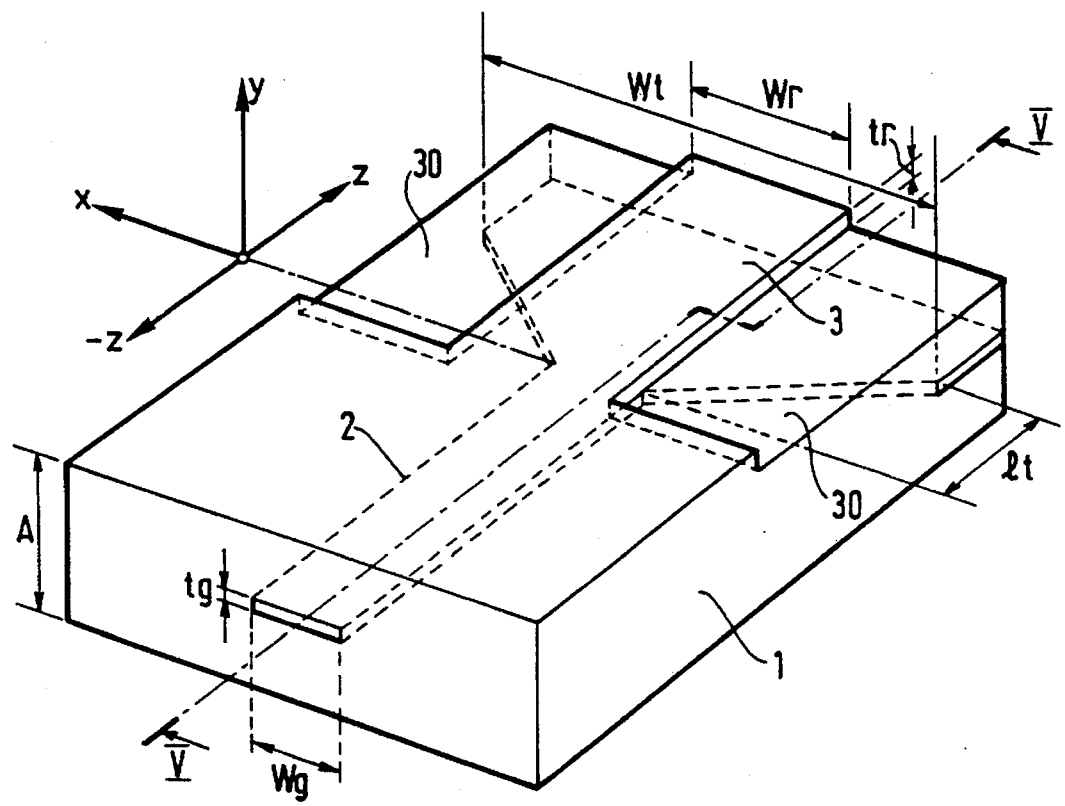
FIG. 4 is a diagrammatic perspective view, partly transparent, of a transition in accordance with the invention.

FIG. 4 is a diagrammatic perspective view, partially transparent, showing one example of a transition in accordance with the invention, as made by the fabrication steps shown in the previous figures. The description of this figure and the reference numbers used in it are identical to their counterparts for FIGS. 1 through 3 and for this reason the description need not be repeated.

FIG. 4 is instructive in that it shows the special relationship between the lateral confinement structures (+/−x) of the guided wave in a preferred propagation direction (+/−z). The "core" or the waveguide layer 2 is the same before, in and after the waveguide transition of the invention. Only the lateral confinement structure changes at the propagation mode transition. In the region −z lateral confinement is assured by the width $w_g$ of the buried waveguide layer. In the region +z lateral confinement is assured by the width $w_r$ of the optical waveguide formed by the ridged optical buried waveguide 3 and the waveguide layer, which widens in the direction +z in the transition area of length $l_t$.

One non-limiting example of the FIG. 4 device can be given by specifying dimensions for the layers and waveguide structures and the materials used. For an optical waveguide transition to operate at a wavelength λ of 1.55 microns (μm), for example, the device shown in FIG. 4 can be implemented on an InP substrate with the waveguide layer and the buried waveguide 2 made from a quaternary substance $In_{1-x}Ga_xAs_yP_{1-y}$.

The parameter y, which determines the forbidden gap of the quaternary material, is chosen to suit the wavelength λ of the light to be conveyed in the waveguide. The parameter y determines the cut-off frequency of the waveguide and therefore the minimal wavelength $\lambda_g$ which can propagate in the guide. For $\lambda<\lambda_g$ light is absorbed and for $\lambda>\lambda_g$ the material is transparent. In the chosen example, to work at λ=1.55 μm, one choice for $\lambda_g$ is $\lambda_g$=1.3 μm, for which y=0.62 approx. Alternatively, for $\lambda_g$=1.5 μm, y=0.89 approx. The parameter x is then chosen so that the lattice matches the substrate, in accordance with rules familiar to the person skilled in the art. The empirical rule is x=y/2.197.

If the value chosen for $\lambda_g$ in FIG. 4 is $\lambda_g$=1.55 μm, the refractive index of the buried optical waveguide is in the order of n=3.57. In this case, lateral confinement can be assured by a waveguide having a width $w_g$=2 μm with an $In_{1-x}Ga_xAs_yP_{1-y}$ waveguide layer approximately 0.1 μm thick. An InP layer is then deposited onto the buried waveguide and lateral confinement is assured by the difference between the optical index of the $In_{1-x}Ga_xAs_yP_{1-y}$ and the surrounding InP.

A few microns above the waveguide layer, in the transition area, the ridged optical waveguide is formed in a top InP epitaxial layer. This structure assures lateral confinement of the guided wave in and after the widening of the waveguide layer in the transition area. To form this structure, etching removes a depth $t_r$ of 1.5 μm on each side of the ridged optical waveguide structure 3, the width of which is about 4 μm, for example.

Figure 5:
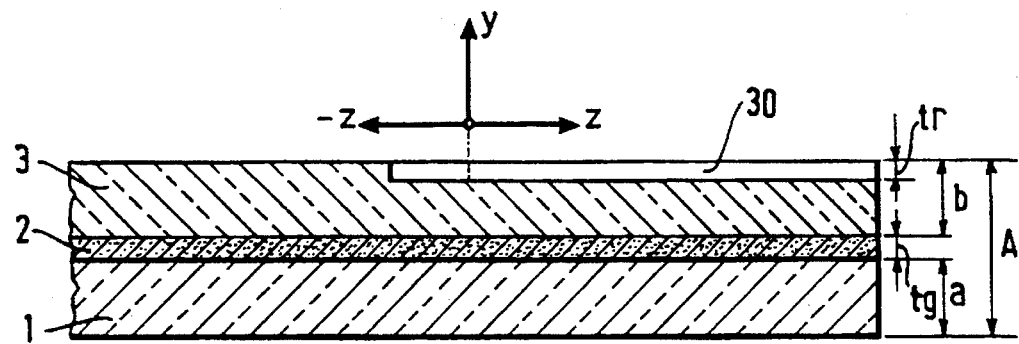
FIG. 5 shows the device from FIG. 4 in section on the line V—V.

FIG. 5 shows the device from FIG. 4 in section on the line V—V. This figure uses the same reference numbers as the previous figures to refer to the same structures. The substrate 1 can be in InP with the waveguide layer 2 in $In_{1-x}Ga_xAs_yP_{1-y}$. In this example the epitaxial layer 3 covering the buried optical waveguide is also in InP. Propagation of the wave will be continuous in the core or the waveguide layer 2 and only the lateral confinement structure changes in the transition region, being below the surface (buried optical waveguide) in the lefthand part of the figure (−z direction) and on the surface (ridged optical waveguide) in the righthand part of the figure (+z direction).

Figure 6:
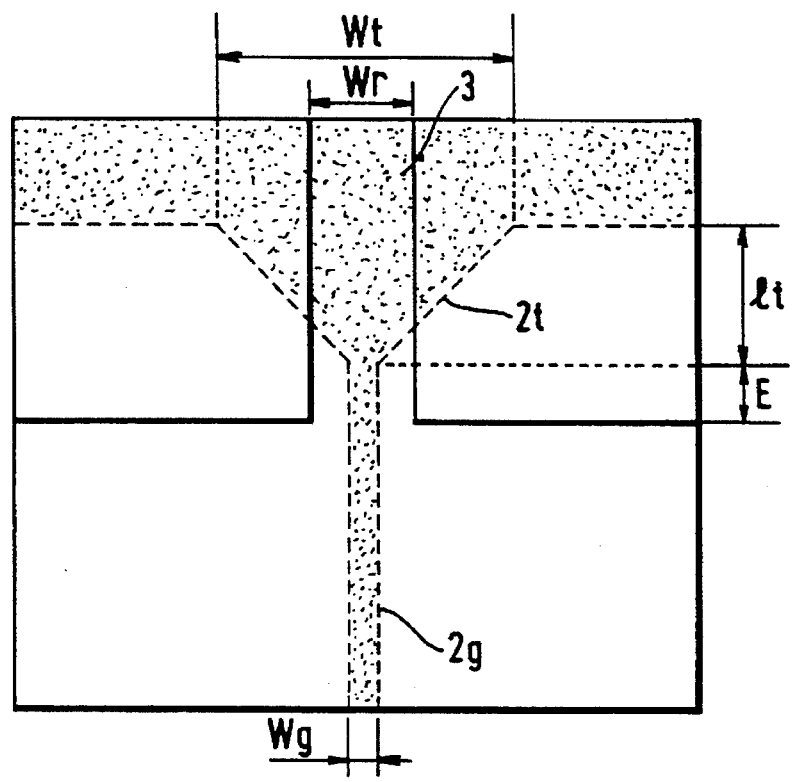
FIG. 6 is a diagrammatic plan view, partially transparent, of one example of a transition in accordance with the invention.

FIG. 6 is a diagrammatic top view, partially transparent, of one example of a transition in accordance with the invention as shown in FIGS. 4 and 5. The same reference numbers refer to the same elements as previously. This figure shows more clearly some dimensions of the device of the invention. In particular, it can be seen that the core or waveguide layer 2 comprises two functional parts, the part $2_g$ which constitutes an optical waveguide by virtue of lateral confinement due to an index difference in the plane of the waveguide layer, and the part $2_t$ which constitutes the waveguide transition region.

In the transition region $2_t$, the width of the core increases which reduces lateral confinement due to the index difference in the plane of the waveguide layer. The transition region can be characterized by the dimensions shown in this figure: the width $w_r$ of the buried optical waveguide before the transition; the length $l_t$ of the transition region in which the width of the core increases; the width $w_t$ of the core at the end of the transition region; and the width $w_r$ of the ridged optical waveguide 3 on the top epitaxial layer, which provides the lateral confinement after the transition. The dimension E is the distance between the start of the ridged optical waveguide and the start of the region in which the core widens in the transition area $2_t$. This dimension is small in a preferred embodiment of the invention, but there is no benefit in reducing it to zero, since this would imply extremely close fabrication tolerances with no significant improvement in terms of expected performance. The dimension E is therefore chosen sufficiently large to avoid fabrication tolerance problems, which makes this dimension non-critical.

FIG. 6 shows the simplest possible geometry of etching the waveguide layer 2 and top layer 3, with the etching boundaries perpendicular to the direction of propagation of light in the optical waveguides. For example, when the transition region $2_t$ widens to a width $w_t$ over a length $2_t$, it can thereafter widen with no limit with no other effect on the light propagating in the optical waveguide. In this example this boundary is at the termination of the transition region $l_t$ parallel to that of the top layer etching and perpendicular to the two lateral confinement structures ($2_g$, 3).

Likewise, the ridged optical waveguide begins at the boundary of the etched region of the top epitaxial layer, which boundary is also perpendicular to the two lateral confinement structures ($2_g$, 3).

Figure 7:
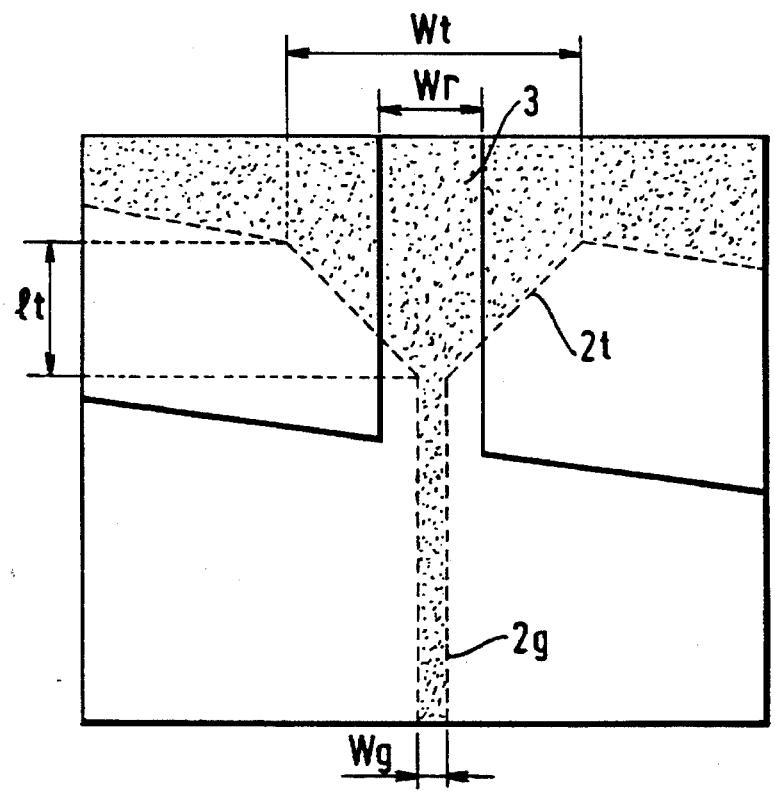
FIG. 7 is a diagrammatic representation, partially transparent, of another example of an optical waveguide transition in accordance with the invention, with an inclined termination to prevent unwanted reflections.

FIG. 7 is a diagrammatic representation, partially transparent, of another example of an optical waveguide transition in accordance with the invention, with an inclined termination to prevent unwanted reflections. The FIG. 7 device is identical to the FIG. 6 device except for the inclination of the boundaries previously described to a direction perpendicular to the waveguide structures. Because the propagation mode change interfaces are inclined, they do not cause the unwanted reflections which can be expected to occur, even if at a low level, in the previous situation (that of FIG. 6).

Figure 8:
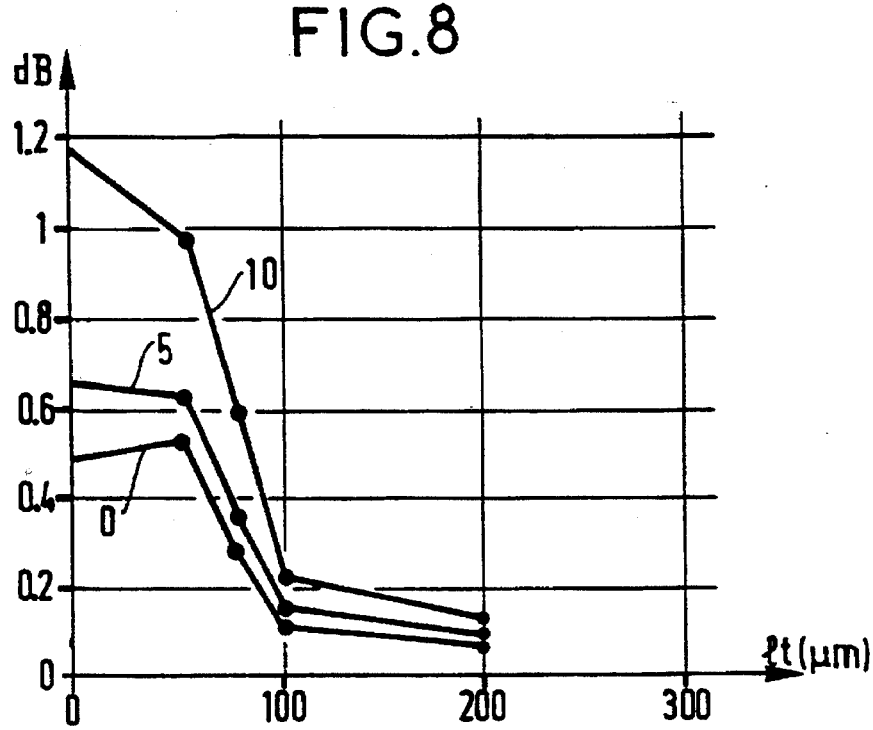
FIG. 8 shows the results of beam propagation modelling (BPM) simulation of the losses due to misalignment of the waveguides of the transition in accordance with the invention as a function of the length $l_t$ of the transition.

FIG. 8 shows the results of beam propagation modelling (BPM) simulation of the losses due to misalignment of the waveguides in the transition of the invention as a function of the length $l_t$ of the transition and for three different values of offset or misalignment. Curve 0 represents the calculation for an offset of 0 µm, curve 5 that for an offset of 0.5 µm and curve 10 that for an offset of 1 µm. The losses of the optical waveguide transition of the invention are low and relatively insensitive to misalignment of the two waveguides for transition lengths $l_t$ greater than 100 µm. This enables industrial fabrication with less severe fabrication tolerances so that production cost can be reduced and yield increased.

Figure 9:
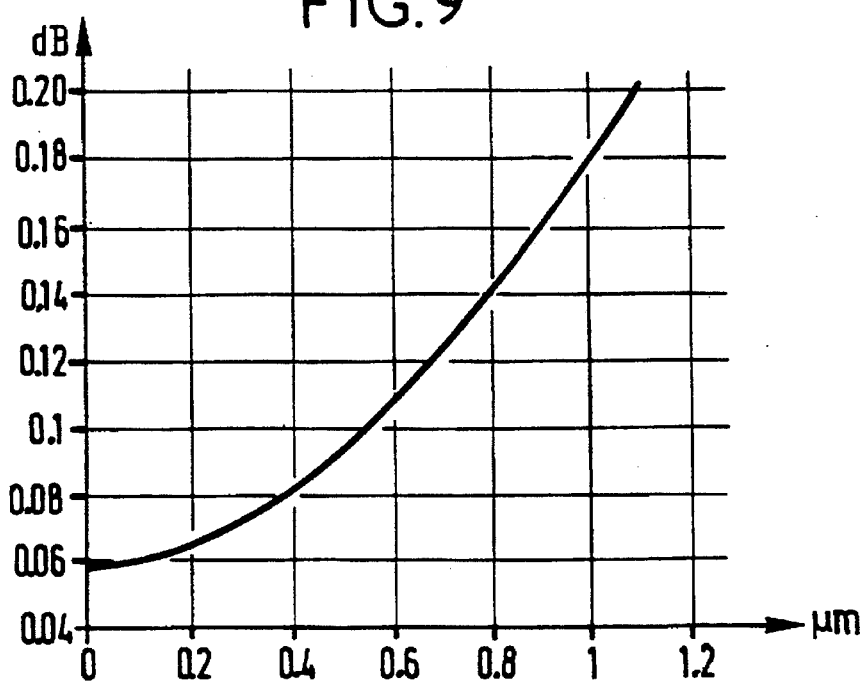
FIG. 9 shows the results of BPM simulation of the losses as a function of the magnitude of a misalignment or offset between the two waveguides of a 200 μm long transition.

FIG. 9 shows the results of BPM simulation of the losses as a function of the magnitude of the misalignment or offset of the two waveguides in the transition for a transition length $l_t$=200 µm. The losses are very low and relatively insensitive to the offset if the latter is small (<0.5 µm, for example), thereafter increasing substantially linearly, whilst remaining low for offsets up to 1 µm.

Figure 10:
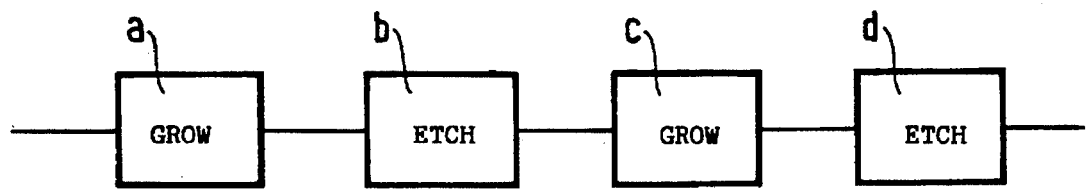
FIG. 10 is a block diagram showing the steps of the method of fabricating an optical waveguide transition device in accordance with the invention.

FIG. 10 is a block diagram showing the essential steps of the method of fabricating an optical waveguide transition device of the invention:

a) growth of at least one epitaxial layer on a substrate;
b) etching of a waveguide layer to define a buried optical waveguide and a transition structure whose width varies with its length, as described above;
c) growth of at least one top epitaxial layer on top of said buried optical waveguide and said transition area;
d) etching a top layer to define a ridged optical waveguide structure, this ridged optical waveguide being in part on top of said buried optical waveguide (in the transition region).

Of course, the invention has been described with reference to a few non-limiting examples of preferred embodiments of the invention and a fabrication method in accordance with the invention has been described in its simplest form; nevertheless, the person skilled in the art will be able to apply the teaching of this patent application to many variants of the invention without this departing from the scope of the required protection, as defined in the following claims.

There is claimed:

1. Optical waveguide transition between a buried optical waveguide and a ridged optical waveguide, enabling wave coupling between propagation made of said buried optical waveguide and a propagation mode of said ridged optical waveguide, said transition comprising a transition area in which said buried optical waveguide widens laterally along its length, and partial overlapping by vertical superposition of transition of the two waveguides in said transitions area enables coupling of said two propagation modes in a preferred direction of propagation in said two waveguides.

2. Optical waveguide transition according to claim 1 wherein said ridged optical waveguide has a constant width over all of its length and said buried optical waveguide has a width which varies adiabatically in said transition area.

3. Optical waveguide transition according to claim 2 wherein said buried optical waveguide has a width which varies linearly in said transition area.

4. Optical waveguide transition according to claim 2 wherein said buried optical waveguide has a width which varies exponentially in said transition area.

5. Optical waveguide transition according to claim 1 wherein said buried optical waveguide and said ridged optical waveguide are formed on the same substrate.

6. Optical waveguide transition according to claim 1, wherein both waveguides have a common waveguide layer.

7. Optical waveguide transition according to claim 1 wherein said transition area has an inclined termination to prevent unwanted reflections.

8. Opto-electronic circuit comprising at least one optical waveguide transition as claimed in claim 1.

9. Integrated opto-electronic circuit comprising at least one optical waveguide transition as claimed in claim 1.

10. Monolithic integrated opto-electronic circuit comprising at least one optical waveguide transition as claimed in claim 1.

11. The optical waveguide transition according to claim 1, wherein said buried waveguide, said ridged waveguide and said transition all operate together as a single waveguide.

* * * * *